July 1, 1969   D. I. PETZ   3,452,821
ROW CROP THINNING IMPLEMENT
Filed Feb. 1, 1966   Sheet 1 of 4

INVENTOR.
Dave I. Petz
BY
Webster & Webster
Attorneys

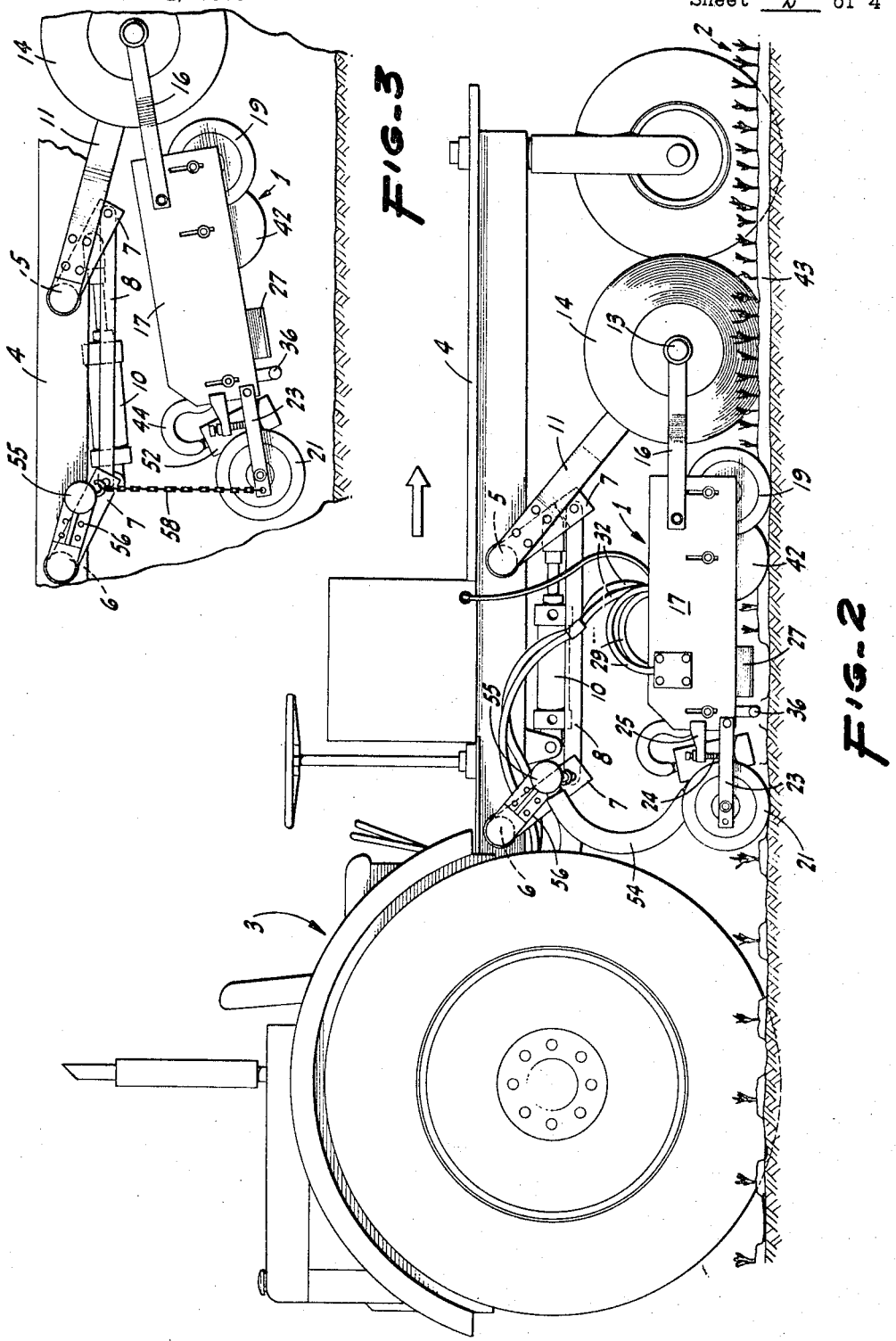

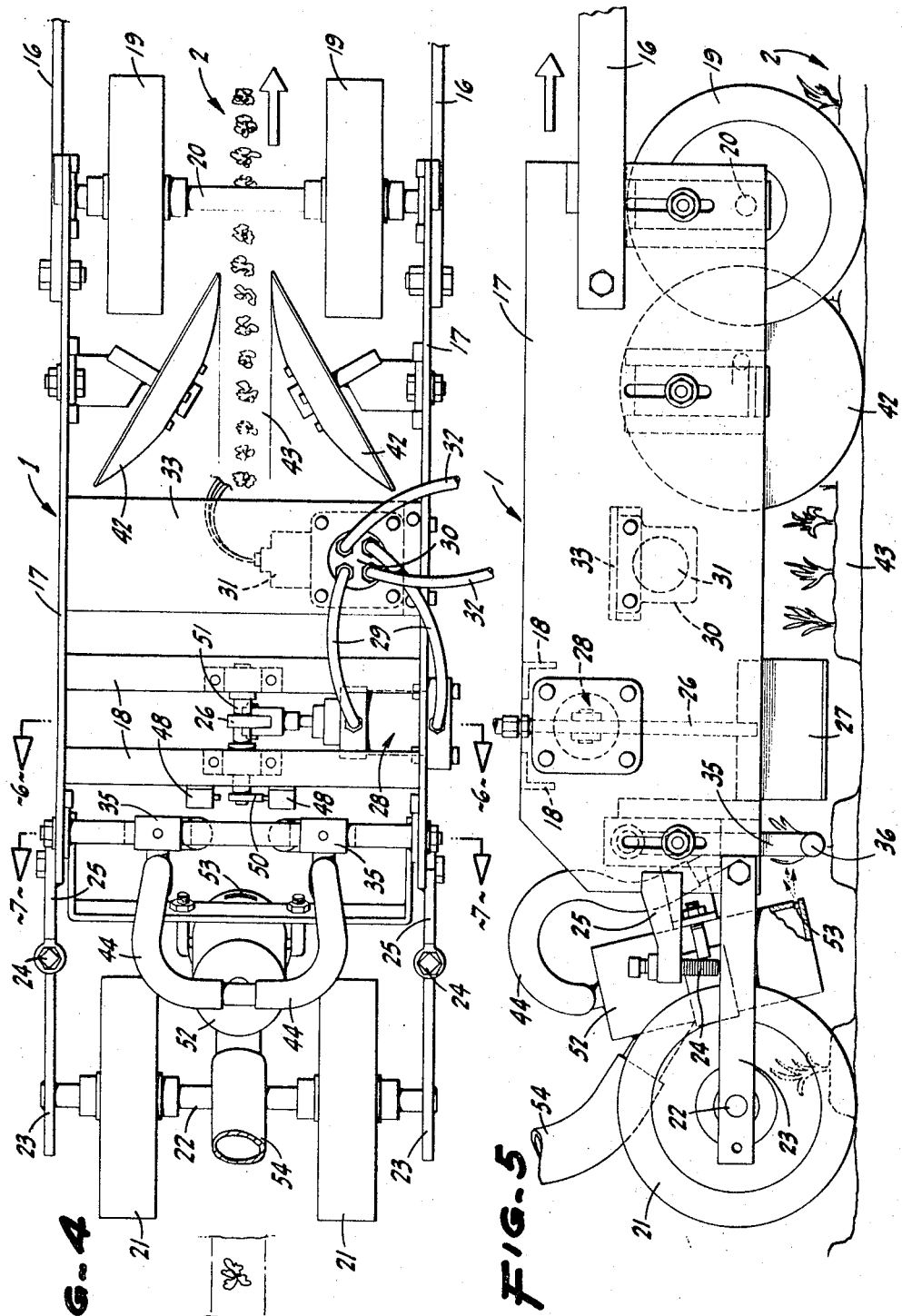

United States Patent Office 3,452,821
Patented July 1, 1969

3,452,821
ROW CROP THINNING IMPLEMENT
Dave I. Petz, Rte. 2, Box 242, Tracy, Calif. 95376
Filed Feb. 1, 1966, Ser. No. 524,336
Int. Cl. A01b *41/06*
U.S. Cl. 172—6                                5 Claims

ABSTRACT OF THE DISCLOSURE

A row crop thinning device including, on a vehicle movable along the row, a plant blocking hoe mounted for powered movement laterally across the row from one side to the other thereof, a plant sensing electric eye unit adjacent the plant blocking hoe, and mechanism responsive to sensing of a plant by such unit operative to cause actuation of said hoe.

---

This invention relates in general to an implement for thinning row crops; the thinning devices which form the major feature of the implement each being automatic in operation and functioning to cut or block out all plants intermediate individual plants left or retained in place in the corresponding row so that such individual plants may grow without crowding.

With each thinning device of the present invention, the plants to be retained are individually detected, as the implement advances, by an electric eye unit which in turn causes the immediate actuation of a blocking hoe or similar blade.

The major object of the invention is to provide each thinning device of the implement with a blocking hoe mounted in a position to work at a predetermined point along the corresponding crop row relative to the position of the electric eye unit. More particularly, the blocking hoe functions to block out all plants in the row for a predetermined distance ahead of each retained plant upon detection or sensing of the latter by said electric eye unit.

In other words, the blocking action occurs in leading relation to each retained plant, and permits of a most effectice detection of the retained individual plants; this primarily for the reason that the electric eye unit reads across an open and unobstructed gap as it approaches and then detects or senses the next plant to be retained.

Another important object of the invention is to provide each thinning device of the implement with a novel shutter mechanism arranged to automatically close off each component of the electric eye unit against the entry of dust or debris which may be thrown up by the actuation of the blocking hoe.

An additional important object of the invention is to provide each thinning device of the implement with a novel air blast assembly having the function of blowing dust and debris away from the components of the electric eye unit when the shutted mechanism is open. Such air blast assembly also serves to blow the foliage of each retained plant forwardly whereby to facilitate the obtaining of an accurate response of said electric eye unit to each such retained plant as the implement advances.

It is also an object of the invention to provide a row crop thinning implement which includes a self-propelled vehicle of tractor type provided with a novel frame structure especially adapted to mount a plurality of the thinning devices, one for each of the several crop rows which the implement spans.

In connection with the above noted frame structure of the vehicle, it is a further object of the invention to mount the individual thinning devices thereon in such a manner that each such device—while straddling a crop row and riding on the ground in the furrows on opposite sides of said row—may undulate vertically in response to the contour or level of such ground and without interfering with any of the other thinning devices. In other words, all of the thinning devices ride the ground and function independently of each other.

A still further object of the invention is to provide a practical, reliable, and durable row crop thinning implement and one which is exceedingly effective for the purpose for which it is designed.

These objects are accomplished by means of such structure and relative arrangement of parts as will fully appear by a perusal of the following specification and claims.

In the drawings:

FIG. 2 is a side elevation of the implement.

FIG. 3 is a fragmentary side elevation of the implement, showing one thinning device in a raised and inoperative position.

FIG. 4 is an enlarged top plan view, partly broken away, of one thinning device in working position.

FIG. 5 is a side elevation of such device, after having completed a plant thinning or blocking operation.

Figure 1:
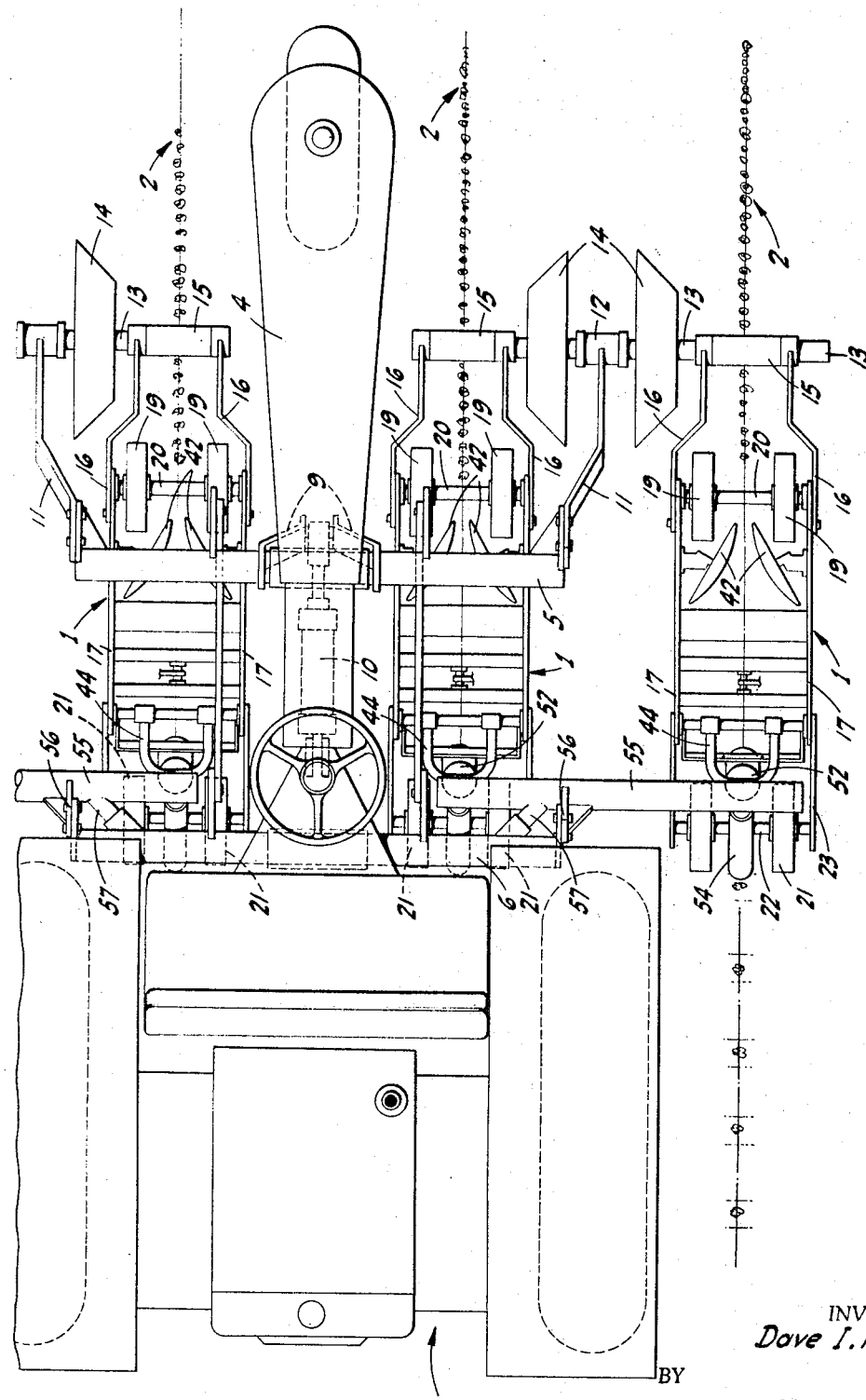
FIG. 1 is a fragmentary top plan view of the improved row crop thinning implement; the view showing three of the four included thinning devices.

Referring now more particularly to the drawings and to the characters of reference marked thereon, the row crop thinning devices are each indicated generally at 1; there being four of such devices in the present implement in order to simultaneously thin four rows 2 of growing crops such as sugar beets. Such thinning devices 1 are mounted on a three-wheeled tractor-type vehicle, indicated generally at 3, which includes a central forwardly projecting frame beam 4; the wheels of the vehicle being spaced transversely so as to ride in the furrows between the adjacent crop rows 2.

Journaled in the beam 4 are transversely extending front and rear cross shafts 5 and 6, respectively. Transversed spaced parallel arms 7 depend radially from said shafts, and each pair of such arms is connected by a link 8.

A separate pair of relatively closely spaced arms 9 depend radially from the front cross shaft 5 centrally of the length thereof, or adjacent the beam 4, as shown in FIG. 1. At their lower ends the arms 9 are connected to one end of a generally horizontal power cylinder unit 10, the other end of which is connected to the underside of beam 4, as shown in FIG. 2.

The cross shafts 5 and 6 straddle only the pair of thinning devices 1 adjacent beam 4, and arms 11 depend with a forward and downward slope from the ends of the cross shaft 5. At its lower end each arm 11 supports the bearing assembly 12 of the elongated transverse shaft 13 of a pair of spaced wheels 14; such wheels being bevelfaced and thus shaped to ride in the furrows between the outermost pair of crop rows 2 as shown in FIG. 1. Each shaft 13—beyond or laterally away from the wheels 14—supports sleeves 15 from each of which transversely spaced bars 16 extend rearwardly to rigid connection with the frame-forming side plates 17 of an adjacent thinning device 1, which is thus drawn along as the implement advances.

Since all the thinning devices 1 are of identical construction, a detailed description of one such device will suffice for all.

Each thinning device 1 comprises—together with the side plates 17—cross bars 18 rigidly connecting the same intermediate their ends and at the top thereof. Ground-engaging wheels 19 straddle the corresponding crop row 2 adjacent the forward end of the plates 17; said wheels 19 being mounted on an axle 20 vertically adjustably supported from the side plates 17.

The device 1 is supported at its rear end by similarly spaced wheels 21 journaled on an axle 22, which at its ends is mounted on forwardly projecting arms 23 pivoted at their front ends on the rear ends of the plates 17. Vertically adjustable screws 24 engage the arms 23 on top and intermediate their ends; the screws being mounted in brackets 25 rigid with the side plates 17.

The working level of each device 1 is set, as conditions may require, by vertical adjustment of the wheels 19 and 21.

Figure 6:
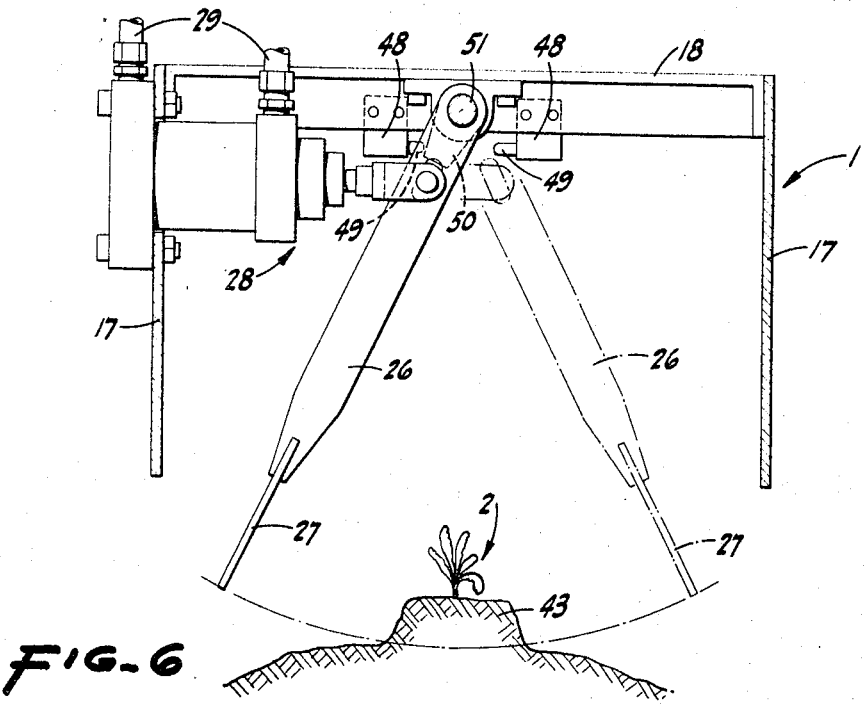
FIG. 6 is an enlarged cross section of one thinning device; the view, taken on line 6—6 of FIG. 4, showing the two positions of the blocking hoe.

Depending and longitudinally pivotally supported from the bars 18 centrally thereof and immediately over the adjacent crop row 2 is an arm 26 on the lower end of which a blocking hoe 27 or similar blade is fixed. Such blocking hoe 27 extends lengthwise of the implement and is disposed so that it will sweep—upon lateral swinging of arm 26—through the crop row 2 a short distance below the normal surface thereof and from which the growing plants of the crop row upstand. See FIG. 6.

The arm 26 is alternately swung from a position to one side of the crop row to a similar position on the opposite side of the row by means of a power cylinder unit 28 which extends transversely of the device 1 and which at one end is connected to the arm 26 intermediate its ends and at the other end is anchored to one of the plates 17.

The power cylinder unit 28 is double-acting and has a stroke of sufficient length to swing the arm 26 equal distances on opposite sides of a vertical plane, or of the plants in the crop row 2. Conduits 29 extend from the power cylinder unit 28 to a reversible four-way valve 30 of conventional form, and which includes an electrical unit 31 to actuate and reverse the valve. Pressure supply and exhaust conduits 32 lead from the valve to suitable flow control means (not shown) on the vehicle 3. The valve is mounted on a rigid cross bar 33 connected between the plates 17 intermediate the top and bottom edges thereof and preferably ahead of the power cylinder unit 28.

Extending between the side plates 17 a short distance back from the power cylinder unit 28 and connected to said plates for vertical adjustment relative thereto is a cross bar 34 from which hollow standards 35 depend—in transversely spaced relation—on opposite sides of the crop row. Connected and open to the standards 35 at the lower ends thereof are transversely extending chambers 36; said chambers being alined, facing each other, and having relatively small axially alined openings 37 at their adjacent ends.

Figure 7:
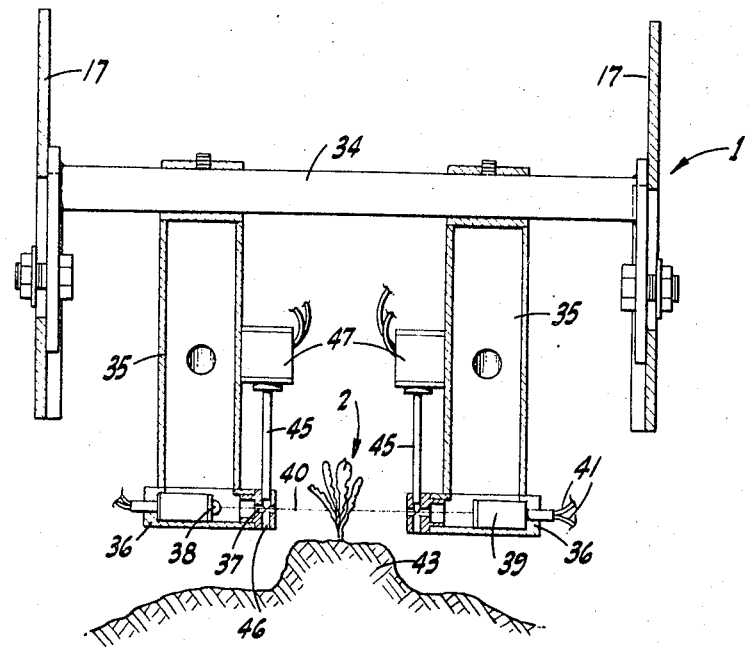
FIG. 7 is an enlarged cross section taken on line 7—7 of FIG. 4; the view showing the electric eye unit.

Mounted in the chambers 36 is an electric eye unit which comprises a light bulb 38 in one chamber facing the other chamber, and a photoelectric cell 39 in said other chamber; the light beam, indicated at 40, passing through the openings 37, and when uninterrupted actuating the cell 39. The mounting bar 34 is set at a level such that the light beam 40 will be interrupted, as the implement advances, by any upstanding plants in the related crop row. See FIG. 7.

Circuit wires 41 extend from the photoelectric cell 39 to certain control mechanism (not shown) on the vehicle, and which mechanism (as the light beam 40 is interrupted by a plant) actuates the electrical unit 31 in one direction or the other so as to shift the valve 30 to alternately supply pressure to one end or the other of the power cylinder unit 28, to cause the arm 26 and blocking hoe 27 to sweep in one direction or the other across the crop row.

In operation, and as each thinning device 1 is advanced along a corresponding crop row 2, the rearmost plant of the unthinned row will interrupt the light beam 40. This causes the power cylinder unit 28 to be actuated to swing the arm 26 and blocking hoe 27 thereon from one side to the other of the crop row, thus sweeping such hoe through the ground ahead of said rearmost plant (which is the one retained) and removing whatever plants may be in the path of the hoe. The blocking hoe 27 may be of a width—or length relative to the longitudinal plane of the thinning device—to cut or block out as many plants at one time as may be desired. Upon completion of each blocking action of the hoe 27, it remains in a position on the other side of the crop row (as indicated in broken lines in FIG. 6) until the power cylinder unit 28 is again and reversibly actuated in response to interruption of the light beam 40 by the next rearmost plant in the row 2 left standing after the above mentioned or previous blocking action of the hoe. The next successive blocking action of the hoe 27 then takes place; the hoe then sweeping from said other side of the row to said one side thereof.

In order that the blocking hoe 27 may sweep through the crop row with a minimum disturbance of the dirt on either side of such row, each thinning device 1 is provided ahead of said hoe with a pair of angled coulter wheels 42. These are disposed on opposite sides of the crop row 2 and are arranged to cut and deflect a certain amount of dirt away from the row, leaving the plants on a raised ridge 43 which extends lengthwise of the row and implement. Thus, in its swinging movement, the blocking hoe only engages such relatively narrow ridge and the throwing of dirt is minimized.

The dirt, however, is apt to be dry and dusty at plant thinning time and, even with the small amount of dirt disturbed during a plant thinning operation, there may be a tendency for the small openings 37 to become clogged by dust as thrown by the blocking hoe. This interferes with the desired sharpness of the light beam 40, and thus prevents the photoelectric cell 39 from functioning properly.

This undesirable condition is prevented by a filtered stream of air under pressure fed through conduits 44 into the hollow standards 35 from which such air passes into the chambers 36 and thence through the opennings 37, thus keeping the same clear.

To further protect the components of the electric eye unit, the openings 37 may be mechanically closed while the hoe 27 is swinging. This is accomplished by downwardly movable, normally raised shutters 45 (in the form of rods) disposed laterally in from the standards; the shutters being slidably engaged at their lower ends in vertical passages 46 in the chambers 36 and which passage intersect the openings 37. When the shutters are in raised position, their lower ends are above and do not obstruct said openings 37.

The upper portions of the shutters 45 are connected to solenoids 47 secured against the sides of the standards 35. The solenoids are in parallel in a circuit in which a pair of alternately operable switches 48 are interposed; these switches—mounted on one cross bar 18—including push buttons 49 projecting toward each other and arranged to be alternately depressed—when the arm 26 is at one end or the other of its swinging stroke—by engagement with a short or stub arm 50 rigid with the axial shaft 51 of the arm 26 and with which shaft said arm is also rigid.

The solenoids 47 are arranged in connection with their circuiting so that as long as one or the other of the push buttons 49 is depressed—as when the arm 26 is at one end or the other of its stroke—the shutters 45 remain raised and clear of the openings 37, allowing the air and the light beam 40 free passage through said openings. However, as soon as the depressed push button is released—upon the arm 26 and the hoe 27 starting a swinging movement—the shutters 45 lower and close the openings 37 so that any solid matter, such as small clods or rocks which may be thrown up by the hoe, cannot enter the chambers 36 and possibly damage the delicate parts therein.

To insure an adequate register of a plant being sensed by the photoelectric cell 39, the leaves of such plant must be placed in a position such that the light beam 40 will be cleanly broken by the main body of the plant rather than any stray leaves thereof. To effect such result, an air flow chamber 52 (which may be an air filter tank) is mounted in connection with the plates 17 rearwardly of the standards 35 and centrally of and above the related crop row 2. At the front and adjacent the bottom, the chamber 52 is formed with a transverse slot 53 arranged to direct a stream of air in a forward and somewhat upward direction against the plant being sensed, as indicated in FIG. 5. This causes the leaves of the plant to be straightened up from the rear so that the main body of the plant will be better exposed to the light beam 40.

The condiuts 44 which lead to the standards 35 are connected to the chamber 52 at the top thereof as shown, while a substantial volume of air is fed—under pressure—to the rear side of the chamber through a conduit 54. This conduit (in the case of an implement with a plurality of thinning devices) is connected to a rigid transverse closed-end tube 55 which is fixed on the lower end of a short arm 56 which depends from the adjacent end of the rear cross shaft 6; said arm 56 being substantially parallel to the arms 11. Another conduit 57 is connected to and leads from the tube 55 to a source of air under pressure (not shown) on the vehicle 3. In the present implement there are, of course, two of the tubes 55; each such tube being fed by a conduit 57.

From the foregoing description, it will be seen that—as the implement advances—the various thinning devices 1 function effectively to thin the related crop rows and with predetermined spacing between the retained plants.

Also, by reason of the plant blocking or thinning action taking place ahead of each retained plant, an unobstructed path—for the light beam 40—exists ahead of the latter and to the point of the next plant to be retained. Hence, accidental actuation of the blocking hoe at other than the proper time is unlikely to occur.

As each device is pulled along it may swing vertically or undulate (according to the level of the ground traversed) about the related shaft 13 as an axis; each device being capable of such undulation independently of the other devices.

When it is desired to lift the devices 1 to an inoperative position, as for travel of the implement from field to field, a chain 58 or similar non-extensible link is detachably connected to each such device between the adjacent tube 55 and one of the rear wheel-supporting arms 23, as shown in FIG. 3. Air under pressure is then admitted to the power cylinder unit 10 to cause both shafts 5 and 6 to be turned and to thus swing the arms 11 and 56 forwardly and upwardly. This results in raising of all the devices 1 clear of the ground. The conduits 54, and any other extending between the devices 1 and the implement, are flexible so as to not interfere with the up and down motion or adjustment of such devices.

From the foregoing description, it will be readily seen that there has been produced such a row crop thinning implement as substantially fulfills the objects of the invention, as set forth herein.

Having thus described the invention, the following is claimed as new and useful and upon which Letters Patent is desired:

1. A row crop thinning device comprising, with a vehicle movable along the row, a frame supported from the vehicle, a blocking hoe, means mounting the hoe on the frame for movement laterally across the row from one side to the other thereof, means to so move the hoe, a plant sensing electric eye unit mounted on the frame in longitudinally spaced relation to and adjacent the hoe, and means controlled by the sensing of a plant by said unit to actuate the hoe moving means; the hoe mounting means comprising an arm rigid with and upstanding from said hoe, a pivot on the frame for the upper end of the arm extending lengthwise of the device, and said hoe moving means comprising a transversely extending double acting power cylinder unit connected at one end to the arm intermediate the ends thereof and at the other end to the frame, conduits leading from opposite ends of the cylinder to a source of fluid pressure, a four-way valve interposed in the conduits, and means including a reversible electric device connected to the valve to operate the same and functioning in response to said plant sensing unit.

2. A row crop thinning device comprising, with a vehicle movable along the row, a frame supported from the vehicle, a blocking hoe, means mounting the hoe on the frame for movement laterally across the row from one side to the other thereof, means to so move the hoe, a plant sensing electric eye unit mounted on the frame in longitudinally spaced relation to and adjacent the hoe, and means controlled by the sensing of a plant by said unit to actuate the hoe moving means; the plant sensing unit comprising a light source and a photoelectric cell disposed in alinement on opposite sides of the crop row in a transverse plane at a level adjacent but above the ground, chambers supported from the frame in which the light source and cell are enclosed, the chambers having alined openings in their adjacent ends through which a light beam may pass from said light source to the cell, and normally open shutters operative to close the openings while the hoe is moving.

3. A row crop thinning device comprising, with a vehicle movable along the row, a frame supported from the vehicle, a blocking hoe, means mounting the hoe on the frame for movement laterally across the row from one side to the other thereof, means to so move the hoe, a plant sensing electric eye unit mounted on the frame in longitudinally spaced relation to and adjacent the hoe, and means controlled by the sensing of a plant by said unit to actuate the hoe moving means; the plant sensing unit comprising a light source and a photoelectric cell disposed in alinement on opposite sides of the crop row in a transverse plane at a level adjacent but above the ground, chambers supported from the frame in which the light sources and cell are enclosed, the chambers having alined openings in their adjacent ends through which a light beam may pass from said light source to the cell, normally open shutters operative to close the openings, and means functioning upon movement of the hoe to close and hold the shutters closed for the duration of such movement.

4. A device, as in claim 3, in which said last named means comprises electrical members connected to the shutters to actuate the same, and alternately operable switches in a circuit for said electrical members, the switches being frame mounted in transversely spaced relation, the hoe moving means comprising an arm rigid with and upstanding from the hoe between the switches, a pivot on the frame for the upper end of the arm extending lengthwise of the device, means to oscillate the arm through a stroke of predetermined length, and another arm rigid with said pivot alternately engaging the switches when the first named arm is at one end or the other of its stroke.

5. A row crop thinning device comprising, with a vehicle movable along the row, a frame supported from the vehicle, a blocking hoe, means mounting the hoe on the frame for movement laterally across the row from one side to the other thereof, means to so move the hoe, a plant-sensing electric eye unit mounted on the frame rearwardly of and adjacent the hoe, means controlled by the sensing of a plant in the row by said unit to actuate the hoe-moving means, and means to direct a stream of air under pressure against such plant from rearwardly thereof; said last named means comprising a tank-like air chamber mounted on the frame rearwardly of said plant and to which chamber a source of air under pressure is connected, the chamber having a vertically narrow, unbroken transverse slot in its forward face in position to direct a single relatively wide stream of air forwardly in a plane between the ground and the top of the plant.

References Cited

UNITED STATES PATENTS

| | | | |
|---|---|---|---|
| 1,718,818 | 6/1929 | Hanson | 172—73 |
| 2,400,562 | 5/1946 | Marihart | 172—6 |
| 2,592,689 | 4/1952 | Hann | 172—6 |
| 2,864,292 | 12/1958 | Elliott et al. | 172—6 |
| 3,358,775 | 12/1967 | Garrett | 172—6 |

ABRAHAM G. STONE, *Primary Examiner.*

RONALD C. HARRINGTON, *Assistant Examiner.*